Dec. 15, 1953   H. O. SEIGEL   2,663,004
METHOD FOR DETERMINING THE SIZE OF A SUBSURFACE ORE BODY
Filed March 15, 1952   2 Sheets-Sheet 1

INVENTOR.
HAROLD O. SEIGEL
BY
Taylor, Cifelli & Jurick
ATTORNEYS

Dec. 15, 1953  H. O. SEIGEL  2,663,004
METHOD FOR DETERMINING THE SIZE OF A SUBSURFACE ORE BODY
Filed March 15, 1952  2 Sheets-Sheet 2

INVENTOR.
HAROLD O. SEIGEL
BY
*Taylor, Cifelli & Jurick*
ATTORNEYS

Patented Dec. 15, 1953

2,663,004

UNITED STATES PATENT OFFICE 2,663,004

METHOD FOR DETERMINING THE SIZE OF A SUBSURFACE ORE BODY

Harold O. Seigel, Jerome, Ariz., assignor to Newmont Mining Corporation, New York, N. Y., a corporation of Delaware Application March 15, 1952, Serial No. 276,894

2 Claims. (Cl. 324—10)

This invention relates to geophysical exploration and more particularly to a novel method for determining the approximate size of a subsurface ore zone associated with an intersection.

It is known that metallic minerals are usually found in nature in the form of sulphides and various methods are now in use by which the presence of such subsurface ore bodies may be established. In addition to establishing the mere presence of mineralization within a given region it is essential to determine the relative size of the ore body so as to warrant undertaking a mining operation.

An object of this invention is the provision of a method for determining the approximate size of an ore body which has been intersected by a drill hole or other underground opening.

An object of this invention is the provision of a method for determining the approximate size of a sub-surface ore body which method comprises sending a charging current through the ground from one side of the ore body, measuring the resulting voltage appearing across a pair of pick-up electrodes at least one of which is inserted into the ground on the opposite side of the ore body, moving one of the pick-up electrodes a known distance further from the ore body and again measuring the resulting voltage, the size of the ore body being determined by the spacing at which the measured voltage first returns to that to be expected for barren rock at the same spacing.

An object of this invention is the provision of a method for determining the size of a sub-surface ore body said method comprising inserting a pair of current electrodes into the ground one such electrode being proximate to one surface of the ore body and the other at a point far removed from the body, passing a charging current through the said electrodes, inserting a pair of pick-up electrodes into the ground one such electrode being proximate to the opposite surface of the ore body and the other at a point far removed from the body, measuring the resulting voltage across the pick-up electrodes, uniformly increasing the distance of the proximate current and pick-up electrodes from the surface of the ore body and again measuring the resulting voltage across the pick-up electrodes, the variation in the resulting voltages being indicative of the approximate size of the ore body.

An object of this invention is the provision of a method for determining the approximate size of a sub-surface ore body said method comprising inserting a first current electrode into the ground at a point far removed from the ore body and a second current electrode a known distance away from one side of the ore body, inserting a first pick-up electrode into the ground on the opposite side of the ore body, the distance of the first pick-up electrode from the approximate center of the ore body between substantially the same as the distance between the second current electrode and the approximate center of the ore body, inserting a second pick-up electrode into the ground at a point substantially aligned with the said second current and first pick-up electrodes, the distance between the first and second pick-up electrodes being equal to that between the second current and first pick-up electrodes, passing a current between the two current electrodes and measuring the resulting voltages across the pick-up electrodes, moving the two pick-up electrodes further from the ore body while maintaining an equal spacing between the two pick-up electrodes and between the second current electrode and first pick-up electrode, and again measuring the resulting voltage across the pick-up electrodes, the variation of the resulting voltage determining the approximate size of the ore body.

These and other objects and advantages will become apparent from the following description when taken with the accompanying drawings illustrating the practice of the invention. It will be understood the drawings are for purposes of illustration and are not to be construed as defining the scope or limits of the invention, reference being had for the latter purpose to the appended claims.

In the drawings wherein like reference characters denote like parts in the several views.

Figure 1:
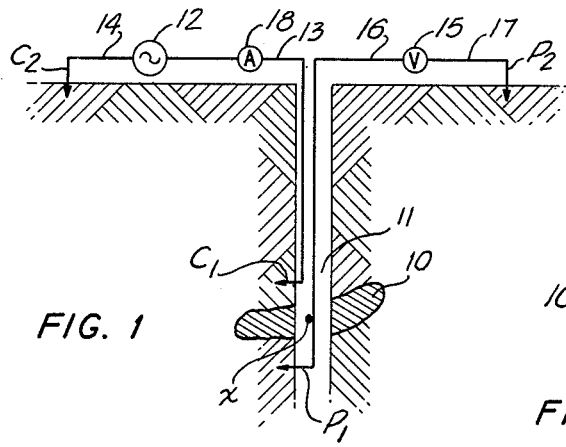
Figure 1 illustrates one particular electrode arrangement used in the practice of the invention.
Figure 2:
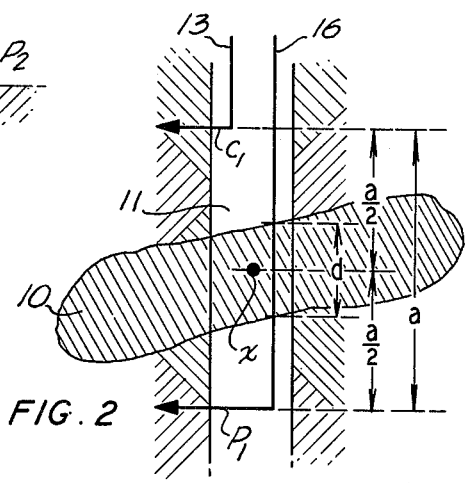
Figure 2 is a fragmentary, enlarged view of Figure 1 and showing the spacing arrangement of the electrodes proximate to the ore body.
Figure 5:
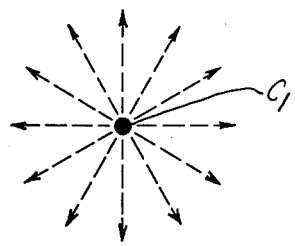
Figure 5 illustrates the substantially uniform distribution pattern of current flow from a current electrode inserted into the ground at a point far removed from the other current electrode and in the absence of any inhomogeneities in the vicinity of such electrode.
Figure 6:
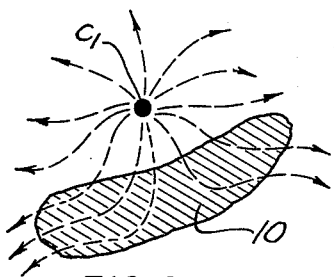
Figure 6 is similar to Figure 5 and showing the change in the current distribution pattern caused by a conducting body in the vicinity of the electrode.

Reference is now made to Figures 1 and 2. The sub-surface ore body 10 is shown intersected by a drill hole 11, the approximate width of the ore body along the drill hole being designated by $d$. A pair of current electrodes $C_1$, $C_2$ are inserted into the earth and connected to a current source 12 by the leads 13, 14, respectively. Such current source may be of any conventional type and the current produced thereby may be a direct current, a commutated direct current, or a low frequency sinusoidal current. The magnitude of the current flowing is measured by a suitable current measuring device 18. The current electrode $C_1$ is spaced a known distance, $$\frac{a}{2}$$

from the approximate center X of the ore body, taken along the drill hole, and the other current electrode $C_2$ is disposed at a point relatively far removed from the electrode $C_1$. In such arrangement, the current flow from the electrode $C_1$ is substantially uniform in all directions in the absence of any inhomogeneities in the vicinity of such electrode, such uniform current distribution pattern being shown in Figure 5. However, when a relatively good conducting ore body is present in the vicinity of the electrode, the current distribution pattern is altered significantly, as shown in Figure 6. The current now tends to flow out of the ends of the ore body rather than across and through the body. The quantity of current drawn by the good conducting body depends upon the dimensions of the body, its conductivity relative to that of the surrounding medium, and on the spacing between the current electrode $C_1$ from the body. These factors can be related, by observing the posentials developed in the region on that side of the ore body opposite to the current electrode, so as to make possible an approximate determination of the size of the ore body.

Referring again to Figures 1 and 2, a pair of pick-up electrodes $P_1$, $P_2$ are inserted into the earth and connected to a suitable voltage-measuring device 15 by the leads 16, 17, respectively. The pick-up electrode $P_1$ is disposed on the opposite side of the ore body from the current electrode $C_1$ and these two electrodes are equally spaced about the midpoint X of the ore intersection. The pick-up electrode $P_2$ is inserted into the earth's surface at a point relatively far distant from either of the electrodes $C_1$, $C_2$ and $P_1$. When a current flows between the current electrodes $C_1$ and $C_2$ a resulting potential will be developed across the pick-up electrodes $P_1$, $P_2$ and the relative magnitude of the resulting potential will be affected by the altered current distribution pattern brought about by the presence of a relatively-good conducting ore body 10 disposed between the electrodes $C_1$ and $P_1$. The effect of such ore body is a lowering of the voltage appearing across the pick-up electrodes $P_1$ and $P_2$.

By changing the separation between the electrodes $C_1$ and $P_1$ (distance, $a$, Figure 2) while maintaining the center of such distance at the midpoint X of the ore intersection, the length portion of the ore body which affects the value of the measured voltage across $P_1$ and $P_2$ is changed. For example, if the electrodes $C_1$ and $P_1$ be placed right at the boundaries of the ore intersection (in which case the separation between these electrodes is approximately $d$, Figure 2) the measured voltage is affected but little by changes in the length of the ore body since this voltage is mainly affected by the material of the ore body lying between the two electrodes. In such case the voltage reading across the two pick-up electrodes is mainly a function of the electrical resistivity of the ore body. However, by increasing the separation between the electrodes $C_1$ and $P_1$ several fold the value of the measured voltages becomes sensitive to the size of the intervening ore body. Thus, in practicing my method I start with the distance $a$ very small and increase such distance in discreet steps while maintaining the center of $C_1$, $P_1$, fixed and making a measurement of the voltage at each step. The variation in the voltage, with increasingly larger spacings between these electrodes, gives the variation of the cross-section of the body with distance away from the drill hole.

Figure 7:
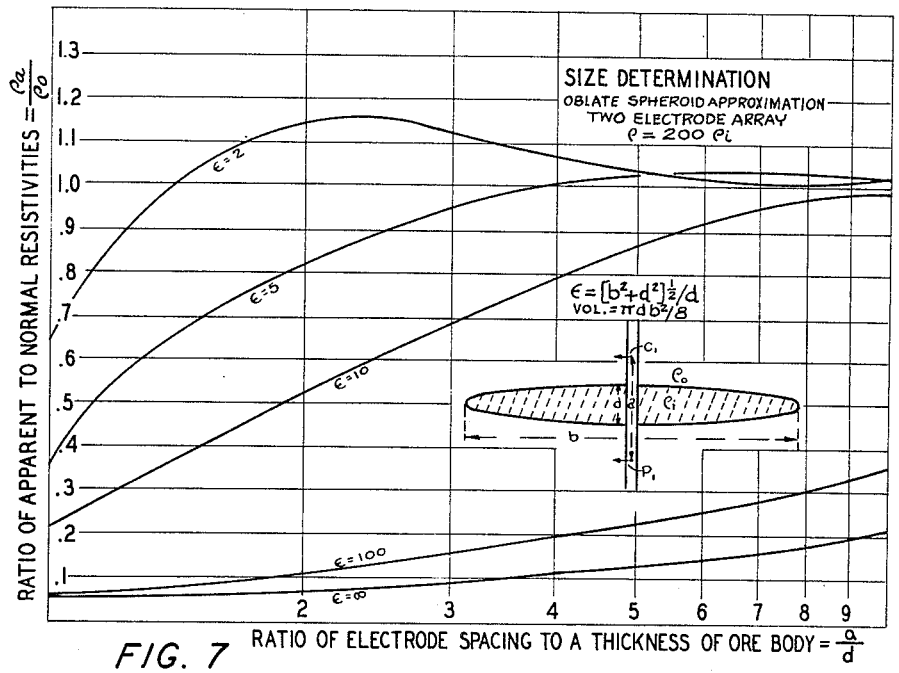
Figures 7 and 8 are theoretical curves showing the variation in the ratio of the apparent to normal resistivities or voltage drops as a function of the spacing of the two and three electrode arrangements shown in Figures 1 and 3, respectively.

Reference is now made to Figure 7 for an illustration of the type of data obtainable by the arrangement shown in Figures 1 and 2. These curves represent the values of the voltages which theoretically would be obtained if the ore body has the shape of an oblate spheroid and the drill hole intersection, in which the measurements are made, lies on the axis of rotation of the body. For convenience, in Figure 7, instead of plotting observed voltages V as such, we have plotted the "apparent resistivity $\rho a$" which is related to observed voltage V by the relation $$\rho a = 4\pi a \frac{V}{I}$$

where $a$ is the separation between $C_1$ and $P_1$ and I is the steady current flowing into the medium from $C_1$. This has been plotted in the form of a ratio $\rho a/\rho o$, where $\rho o$ is the constant resistivity which is normally characteristic of the surrounding medium in the absence of the ore body. It is assumed in this illustrative case that the resistivity, $\rho o$, of the surrounding medium is equal to about 200 times the resistivity $P_1$ of the ore body, which is often the case with respect to a mass of sulphide material in otherwise barren ground. The abscissae of the curves are marked in terms of the ratio $a/d$, $a$ being the spacing between the electrodes $C_1$ and $P_1$ disposed on opposite sides of the ore body and $d$ being the thickness of the ore body along the drill hole. The ordinates are marked in terms of the ratio of apparent resistivity $\rho a$ to the normal resistivity $\rho o$ of the surrounding barren region. It will be observed that the form of the individual curves vary markedly with the change in extension of the good conducting body away from the intersection. It will be noted in particular that the apparent resistivity indicated first approximates to the uniform value $\rho o$, which would be experienced in the absence of the ore body 10, when the separation $a$ is about equal to the width of the body. Since for mining exploration purposes a very approximate idea of extent suffices we can directly apply this fact to my procedure.

Hence all that is required for a simple procedure to determine the extent of the ore body away from the intersection is a uniform expansion of the electrodes $C_1$ and $P_1$ symmetrical to the ore intersection until the observed voltage drops, or apparent resistivity, approximates the voltage drop or resistivity for barren rock.

Figure 3:
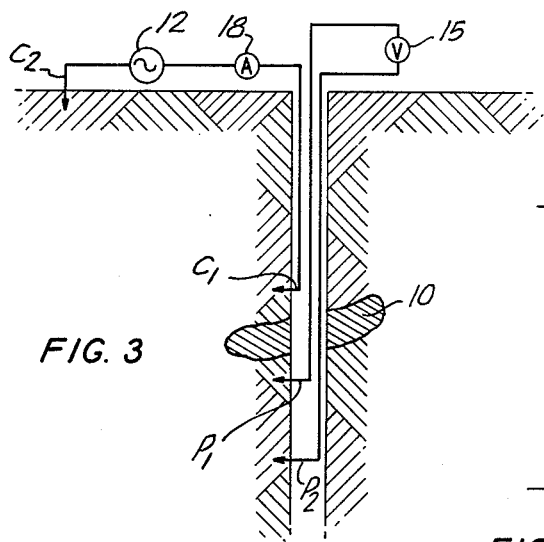
Figures 3 and 4 are similar to Figures 1 and 2, respectively, and showing another arrangement of the pick-up electrodes.
Figure 4:
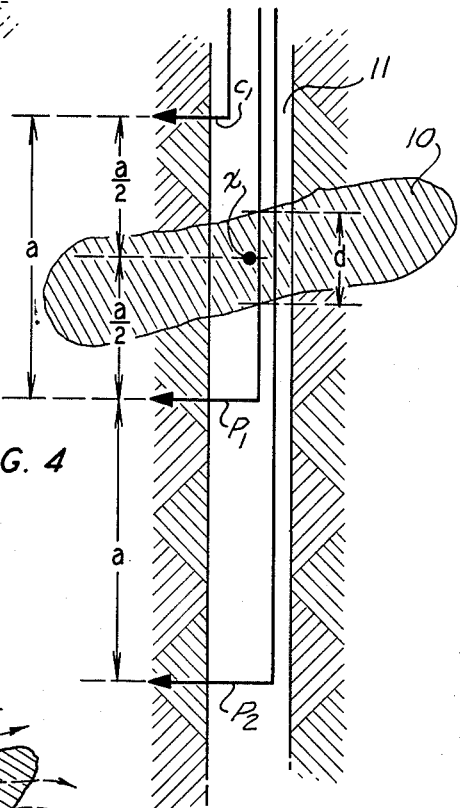

Figures 3 and 4 illustrate another arrangement of the pick-up electrodes. Here both of the pick-up electrodes $P_1$ and $P_2$ are disposed on the far side of the ore body 10, with the distance between the electrodes $C_1$ and $P_1$ equal to $a$, and the distance between the two pick-up electrodes $P_1$ and $P_2$ also equal to $a$. Voltage measurements are again observed as a function of the spacing $a$, the electrode separations $C_1$, $P_1$ and $P_1$, $P_2$ being increased uniformly step-by-step while maintaining the center point between the electrodes $C_1$ and $P_1$ at the midpoint X of the ore body taken along the drill hole 11.

Figure 8:
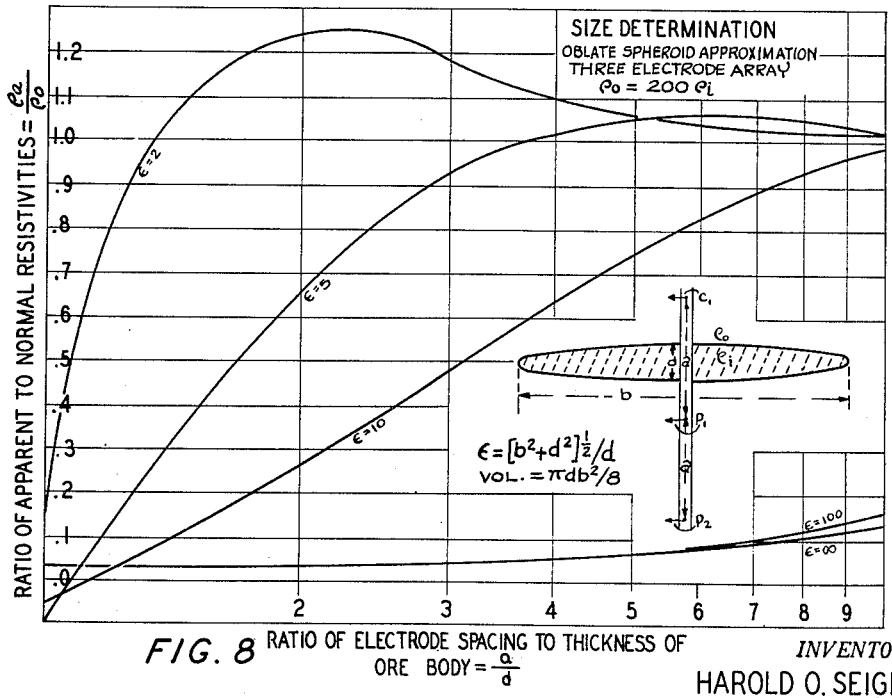

The curves shown in Figure 8 illustrate that the same approximate conditions hold for the three electrode array and that when the spacing $C_1$, $P_1$ is about equal to the ore extent the observed voltage drops (or resistivity) will have become about equal to that for otherwise barren rock.

As a practical matter, once having established the variation of the voltages or apparent resistivities with increasing separation of the electrodes within the drill hole or other opening the approximate extent of the ore body can be determined quite readily in the field. A voltage value is obtained across the pick-up electrodes for a fixed magnitude of current flowing through the current electrodes and with the electrodes proximate to the ore body separated by a small distance $a$. These electrodes are then separated further from the center of the ore body and for each such electrode separation the voltage across the pick-up electrodes is observed. The value of the spacing for which the observed voltage first approaches that to be expected in barren rock is then approximately equal to the total width of the ore body away from the intersection of the ore body. Also a rapid rate of change of the resulting voltages may be taken as evidence that the ore body has a length not greatly exceeding its width $d$ at the drill hole. A gradual rate of change, however, will indicate the ore body has a length many times the width $d$ at the drill hole. These last rules are important in instances where one has not sufficient available space about the intersection to expand the electrode spacing until the observed voltages return to the values to be expected for barren material.

Having now described my invention what I desire to protect by Letters Patent of the United States is set forth in the following claims.

I claim:

1. A method for determining the approximate size of a sub-surface ore body which method comprises establishing an intersection through the ore body, maintaining a current flow of fixed magnitude through the earth between two current electrodes, the first current electrode being spaced a relatively short predetermined distance from one side of the ore body, and the second current electrode being spaced a large distance from the ore body and from the said first electrode measuring the resulting voltage across a pair of pick-up electrodes, the first pick-up electrode being spaced from the opposite side of the ore body a distance equal to the similar spacing of the said first current electrode and the second pick-up electrode being spaced a large distance from either of the current electrodes and from the said first pick-up electrode; uniformly increasing the spacing of the said first current electrode and the said first pick-up electrode from the proximate sides of the ore body and again measuring the resulting voltage across the pick-up electrodes, the spacing at which the resulting voltage approaches that to be expected for barren rock being indicative of the approximate size of the ore body.

2. A method for determining the approximate size of a sub-surface conducting ore body which method comprising establishing an opening through the ore body; contacting the ground with a first current electrode disposed within the opening and on one side of the ore body, said electrode being spaced a predetermined distance from the approximate center of the ore body taken along the line of the opening; contacting the ground with a second current electrode at a point relatively far distant from the said first current electrode; maintaining a current flow of fixed magniture between the two current electrodes; contacting the ground with a first pick-up electrode disposed within the opening and on the other side of the ore body, said electrode being spaced from the said center of the ore body a distance equal to the similar spacing of the first current electrode; contacting the ground with a second pick-up electrode at a point within the opening and in substantial alignment with the first current electrode and first pick-up electrode, the spacing between the two pick-up electrodes being equal to the spacing between the first current electrode and first pick-up electrode; measuring the resulting voltage across the pick-up electrodes; increasing the separation between the first current electrode and first pick-up electrode, keeping the ore body midway between those electrodes; changing the position of the second pick-up electrode so that its separation from the first pick-up electrode becomes again equal to the separation between the first current and first pick-up electrodes; and again measuring the resulting voltage across the pick-up electrodes; again increasing the relative spacing of the electrodes in a similar manner and measuring the resulting voltages across the pick-up electrodes; the size of the ore body being determined when the value of the resulting voltage approaches the known resulting voltage that obtains in barren rock material.

HAROLD O. SEIGEL.

References Cited in the file of this patent

UNITED STATES PATENTS

| Number | Name | Date |
|---|---|---|
| 1,884,364 | Sundberg | Oct. 25, 1932 |
| 1,966,105 | Ostermeier | July 10, 1934 |
| 2,172,271 | Athey et al. | Sept. 5, 1939 |
| 2,179,593 | Jokosky | Nov. 14, 1939 |
| 2,599,688 | Brant | June 10, 1952 |
| 2,613,247 | Lee | Oct. 7, 1952 |